United States Patent [19]

Bois et al.

[11] 4,268,039
[45] * May 19, 1981

[54] TANGENTIAL PICK-UP DEVICE FOR A GRAMOPHONE TURN-TABLE

[76] Inventors: Daniel Bois, Chouilly, Geneva, Switzerland, CH-1242; Jan Olsfors, Route de Divonne, 18, Nyon, Vaud, Switzerland, CH-1260

[*] Notice: The portion of the term of this patent subsequent to Aug. 17, 1996, has been disclaimed.

[21] Appl. No.: 30,560

[22] Filed: Apr. 16, 1979

Related U.S. Application Data

[63] Continuation of Ser. No. 788,890, Apr. 19, 1977, Pat. No. 4,149,730.

[30] Foreign Application Priority Data

Apr. 27, 1976 [CH] Switzerland .................. 5264/76

[51] Int. Cl.³ .................................... G11B 3/38
[52] U.S. Cl. .................................... 369/220
[58] Field of Search ............... 274/23 R, 23 A, 13 R, 274/14, 15 R

[56] References Cited

U.S. PATENT DOCUMENTS

| 2,566,091 | 8/1951 | Masterson | 274/23 A |
| 2,905,475 | 9/1959 | Cheeseboro | 274/23 A |
| 3,572,724 | 3/1971 | Rabinow | 274/23 A |
| 3,622,163 | 11/1971 | Bachman | 274/23 A |
| 3,873,762 | 3/1975 | Taylor | 274/23 A |

FOREIGN PATENT DOCUMENTS 2419139 11/1974 Fed. Rep. of Germany .... 274/23 R

Primary Examiner—John W. Shepperd
Attorney, Agent, or Firm—Emory L. Groff, Jr.

[57] ABSTRACT

A tangential pick-up device for a gramophone turntable comprises a pick-up head on a support connected by a floating articulation to a carriage which is driven along a radially-disposed arm by a servo-control device to hold the support in a reference position. The floating articulation of the support, e.g. by a guided pivot member, is arranged so that shocks or vibrations tend to cause pivoting of the support about two axes disposed radial and perpendicular to a disc and intersecting adjacent the pick-up needle, whereby jumping of the needle is avoided.

4 Claims, 7 Drawing Figures

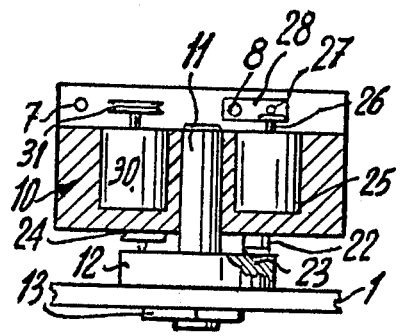
FIG. 3
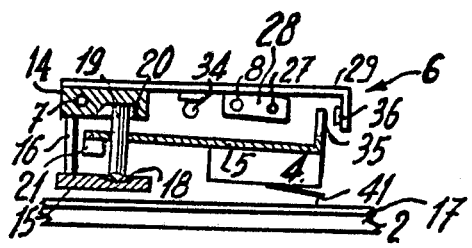
FIG. 4
FIG. 5
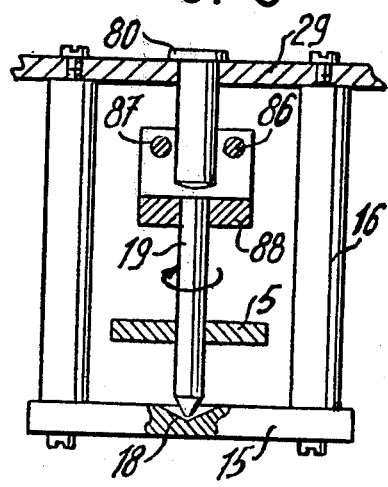
FIG. 6
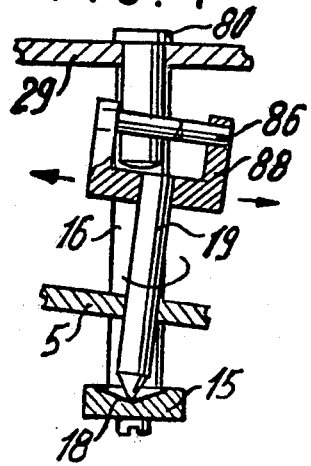
FIG. 7

TANGENTIAL PICK-UP DEVICE FOR A GRAMOPHONE TURN-TABLE

This is a continuation, of application Ser. No. 788,890, filed Apr. 19, 1977 now U.S. Pat. No. 4,149,730.

The invention relates to pick-up devices for gramophone turn-tables.

One already knows tangential pick-up devices comprising a pick-up head mounted on a support articulated on a carriage, this carriage being movable along at least one rectilinear guide parallel to a radius of reading a disc through the geometrical location of a needle of the pick-up head during reading of a disc, a device supplying a quantity representing the position of the support in relation to the carriage, and a servo-motor controlling displacements of the carriage as a function of said signal in a manner to maintain said position in the vicinity of a reference position.

Turn-tables with pick-up devices of this type are advantageous since the needle of the pick-up head moves along a path radial to the disc and remains substantially tangential to the groove during the entire reading of the disc, which limits the forces exerted by the needle on the sides of the groove and ensures a perfect constancy of the reading conditions.

Also, one knows that to reduce as far as possible the wear of discs, it is advisable to provide a very low needle pressure. This is usually obtained by providing the pick-up head with a counter-weight. If there is an overcompensation of the needle pressure, there is however the drawback that very slight shocks, trembling or vibrations, or slight faults of planarity or centring of the disc, suffice to make the needle of the pick-up head jump out of the groove.

The present invention aims to defer to a great extent the appearance of this defect and to enable needle pressures far less than one gram to be achieved without this defect appearing, while making a pick-up device extremely insensitive to shocks and to faults in the planarity and centring of discs, as well as having great facility of manipulation excluding any possibility of jumping of the needle of the pick-up head out of the groove.

To this end, a pick-up device according to the invention is characterized in that:

(a) the length of said support perpendicular to the reading radius is less than the disc radius;

(b) the support is articulated to the carriage by coupling elements at least one of which has a floating point of articulation which is able to become a determined point of articulation by the application of a biasing force on the coupling element(s) in question;

(c) said coupling elements are disposed so that under the action of said biasing force, they limit displacement of the support to two pivoting movements about two axes, a first axis parallel to the rectilinear guide and a second axis contained in a plane which is secant to the first axis, said second axis being transverse to the plane of the disc;

(d) said biasing force is situated in a plane containing the second axis; and (e) the distance between the second axis and the centre of gravity of the support with the parts attached thereto is less than the distance between said centre of gravity and the needle of the pick-up head.

The accompanying drawings show, schematically and by way of example, several embodiments of the invention. In the drawings:

FIGS. 3 and 4 are cross-sections respectively along lines III—III and IV—IV of FIG. 3;

FIG. 5 is an explanatory diagram; and

FIGS. 6 and 7 show a varied form of the articulation device of the pick-up-head visible in FIG. 4.

Figure 1:
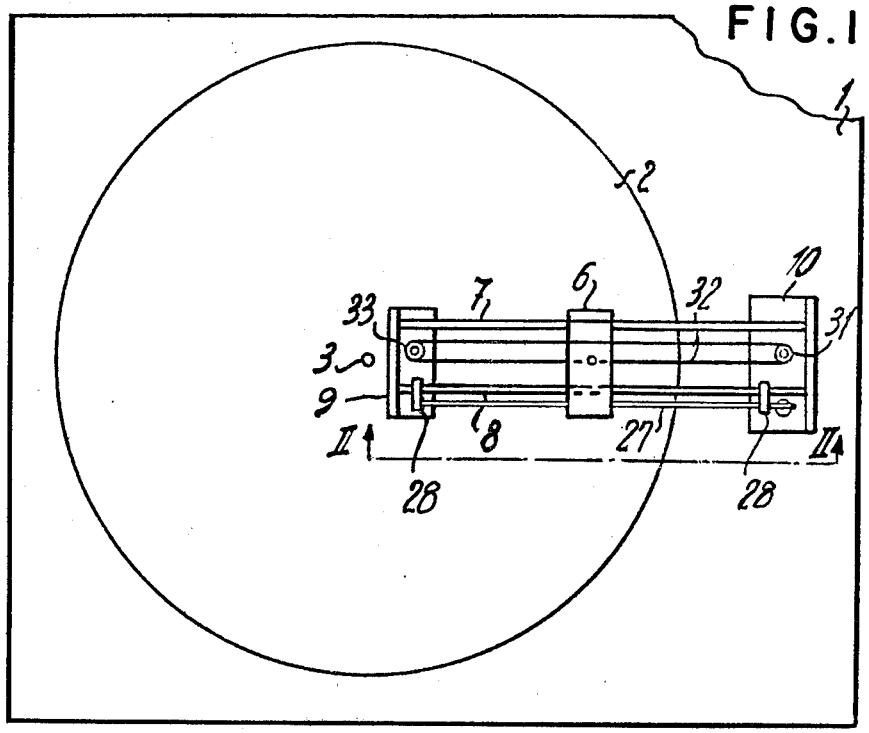
FIG. 1 is a plan view of an embodiment of the present invention.
Figure 2:
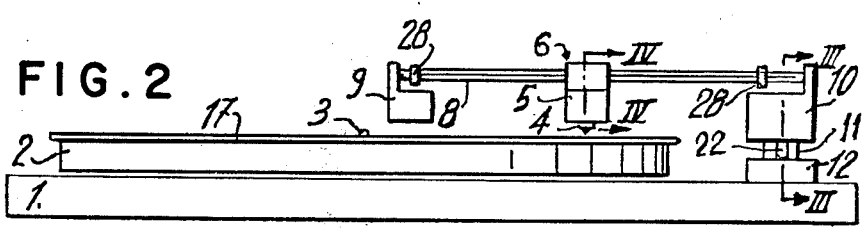
FIG. 2 is an elevational view along line II—II of FIG. 1.

The gramophone turn-table shown in FIGS. 1 and 2 comprises a plate 1 on which is mounted a rotary disc-carrying table 2 carried by a pivot 3. A pick-up head 4 is fixed to a support 5 which is articulated about a generally vertical axis on a carriage 6. The carriage 6 is movable along a guide formed by a rod 7 extending parallel to the plane of table 2. The rod 7 forms, with another parallel rod 8, an arm which comprises two end blocks 9 and 10.

In FIGS. 1 and 2, this arm is shown in a reading position in which it extends radially in relation to the table 2; its end formed by the block 9 is free and is located close to the centre of table 2. Its other end is formed by the block 10 which pivots about a vertical axis on a tube 11 fixed on a block 12. This vertical pivot is fixed on the plate 1 by a nut 13.

FIG. 4 shows on a greater scale an articulation device between the support 5 of the pick-up head 4 and the carriage 6. The carriage 6 comprises an upper block 14 slidably mounted on the rod 7 and a plate 15 connected by struts 16 to the block 14. The plate 15 is very close to the upper surface of a disc 17 placed on the table 2 and has a shallow conical recess 18 receiving a conical pointed end of a pivot 19. The upper end of pivot 19 is engaged in a slot 20 of the block 14. The support 5 is carried by pivot 19 whereby it may pivot about a generally vertical axis, i.e. perpendicular to the table 2, and tip about the point of pivot 19 about an axis parallel to the plane of table 2 and to the rod 7.

The distance between the vertical axis passing through the pivot 19 and the needle of the pick-up head 4 is very small in relation to the radius of table 2. As a result, the support 5 carrying the head 4 and a counter-weight 21 has only a slight moment of inertia about its horizontal tipping axis parallel to the rod 7 and about its vertical axis. Hence, the support 5 may follow all of the vertical and radial movements which may be due either to trembling, or to a defect in the planarity or centring of a disc, without however jumping out of the groove.

The tube 11, which is perpendicular to the plane of the plate 1 and projects from the surface thereof, enables the pick-up arm to be pivoted to free the surface of the table 2, to facilitate the placing and removal of discs. The disc-reading or playing position is provided by a thrust abutment formed by a conical head 22 which comes to engage under the weight of the arm in a conical recess 23 of block 12.

In this position of the arm, a micro-switch 24 carried by the block 10 cooperates with the block 12 to lower the pick-up head 4. To this end, this switch 24 cuts off the supply of an electro-magnet 25 whose mobile armature 26 is then free to upwardly urge, under the action of a biasing spring not shown, a rod 27 parallel to the rod 8 and pivoted thereon by two arms 28. When the rod 27 occupies its raised position, it lifts up a plate 29 forming part of the carriage 6. The carriage 6 thus pivots about the rod 7 and, as the slot 20 has only a limited length, drives the support 5 and the head 4 to move the needle away from the disc.

It is advantageous to provide a friction fit between the arms 28 and the rod 8 so that when the electro-magnet 25 is energized, its mobile armature 26 moves down rapidly, but is followed slowly by the rod 26. In this manner, the lowering movement of the pick-up head 4 onto the disc is very gentle. To the contrary, lifting up of the head 4 takes place rapidly, which is advantageous when the user pivots the arm during playing of a disc. This pivoting cuts off the supply of the electro-magnet 25 by the switch 24, and the pick-up head 4 is immediately lifted up, which avoids any damage to the disc.

During the playing of a disc, the carriage 6 must accompany the reading head 4 as it moves towards the centre of the disc. This is obtained by means of a servo-motor 30 (FIG. 3) carrying a pulley 31 driving a flexible band 32 passing about a guide pulley 33 (FIG. 1). The motor 30 is controlled by the variations of the position of the support 5 in relation to carriage 6. For this purpose, a light beam from a lamp 34 and passing through a slot 35 of the carriage 6 impinges to a greater or lesser degree, depending on the alignment of the slot 35 in the beam of light, on two photoconductors 36 which pilot, by an electric circuit, not shown, but known per se, the driving of motor 30 in the appropriate direction to provide the same quantity of light on the two photoconductors 36. Hence, during reading, the position of the support 5 in relation to the carriage 6 is automatically maintained in the vicinity of a reference position.

As shown in FIG. 4, the horizontal tipping axis of the pick-up head 4 is very close to the upper surface of the disc. By an appropriate articulation device, it is possible to arrange that this axis is virtually situated in the plane of the face of the disc.

Normally, the centre of gravity of the support 5 with the parts attached thereto is very close to its vertical pivoting axis, in such a manner that a radial shock on the table does not tend to pivot the support 5 about this axis and hence make the needle jump out of the groove of the disc.

FIG. 5 shows an advantageous arrangement in the case where the amplitude of said radial shocks is low. The support 5 is schematically shown in plan, 39 indicating its centre of gravity taking into account all of the masses fixed therewith. Also shown by two points are two vertical axes one of which, 40, is the axis of pivoting about the pivot 19 and the other of which passes through the needle 41 of the pick-up head 4. If the assembly is given an impulsion of force in the direction of arrow f, as a result there is a displacement of the centre of gravity 39 in the same direction. Moreover, this impulsion will also tend to pivot the support 5 in the counter-clockwise direction in FIG. 5, because of its inertia. By choosing the distances of the two axes 40 and 40' from the centre of gravity 39 and the moment of inertia of the support 5 about a vertical axis passing through the centre of gravity 39, it is possible to arrange that the instantaneous axis of rotation of the assembly coincides substantially with the axis 41 passing through the needle. This condition is fulfilled when the product of said two distances and the mass of the assembly is equal to the moment of inertia about the vertical axis passing through the centre of gravity 39. The latter arrangement entirely avoids that the accelerations of the carriage 6 due to the operation of the servo-motor 30 produces lateral forces urging the needle 41 against the faces of the groove and alterating the quality of the reproduction.

FIGS. 6 and 7 illustrate a variation of the articulation shown in FIG. 4 in which, as before, pivot 19 bears by its lower pointed end in a conical recess 18 of plate 15. However, the upper end of pivot 19 is guided by a fixed stud 80 carried by plate 29 and about which is engaged with a slight play a rectilinear guide formed by two parallel rods 86 and 87 mounted on a yoke 88 fitted on the upper end of pivot 19. In this case, even for an inclination such as that shown in FIG. 7, the geometrical axis of pivoting remains fixed and is determined by the bottom of the recess 18 and the axis of stud 80.

The above-described embodiments are based on a conventional turn-table construction whose table has a diameter substantially equal to the maximum diameter of discs which can be played with the apparatus. However, it is clear the the invention may be applied to any turn-table constructions, notably those with which the disc supporting and driving means is formed by a hub of substantially smaller diameter than the discs to be played. Also, the plane of rotation of the disc need not necessarily be horizontal, since the arrangement according to the invention can be adapted for turn-tables with which the disc turns in a vertical plane, or even in an oblique plane.

We claim:

1. In a pick-up device for a phonograph record turn-table comprising a tangentially moving tone arm including a mounting block, at least one rectilinear guide member extending parallel to the radius of a record on said turntable, a servo-motor in said mounting block, a carriage movable along said guide member, a support beneath said carriage, a pick-up head at one end of said support, articulation means connecting the other end of said support to said carriage, a device on said carriage supplying an electric signal indicating the position of said support relative to said carriage and said servo-motor controlling the displacement of the carriage in response to said signal, the improvement wherein said rectilinear guide member extends over the record upper face, the length of said support being shorter than the radius of said record, said articulation means comprises a pivot member connected to said support and having a conical point at its lower end, a plate member connected to said carriage and having an enlarged conical seat in which said conical point engages said pivot member extending through said support, a guide member connected to said carriage and including a guiding surface, said pivot member sliding at its upper end along said guiding surface whereby said pivot member may move angularly in a plane perpendicular to the surface of and tangential to the grooves of said record and also rotate around its axis which is substantially perpendicular to the plane of the record, said guide member located further away from the surface of the record than said conical point of said pivot member.

2. In a pick-up device for a phonograph record turntable comprising a tangentially moving tone arm including a mounting block, at least one rectilinear guide member extending parallel to the radius of a record on said turntable, a servo-motor in said mounting block, a carriage movable along said guide member, a support beneath said carriage, a pick-up head at one end of said support, articulation means connecting the other end of said support to said carriage, a device on said carriage supplying an electric signal indicating the position of said support relative to said carriage and said servo-motor controlling the displacement of the carriage in response to said signal, the improvement wherein said rectilinear guide member extends over the record upper face, the length of said support being shorter than the radius of said record, said articulation means comprises a pivot member, connected to said support and having a conical point at its lower end, a plate member connected to said carriage and having an enlarged conical seat in which said conical point engages, said pivot member extending through said support, a stud fixed to said carriage and depending therefrom, a guide member connected to said pivot member and including a guiding surface, said stud sliding along the guiding surface of said guide member, whereby said guide member and pivot member may move angularly in a plane perpendicular to the surface of and tangential to the grooves of said record, and also rotate around a substantially vertical axis of the carriage, said guide member located further away from the surface of the record than said conical point of said pivot member.

3. In a pick-up device for a phonograph record turntable comprising a tangentially moving tone arm including a mounting block, at least one rectilinear guide member extending parallel to the radius of a record on said turntable, a servo-motor in said mounting block, a carriage movable along said guide member, a support beneath said carriage, a pick-up head at one end of said support, articulation means connecting the other end of said support to said carriage, a device on said carriage supplying an electric signal indicating the position of said support relative to said carriage and said servo-motor controlling the displacement of the carriage in response to said signal, the improvement wherein said rectilinear guide member extends over the record upper face, the length of said support being shorter than the radius of said record, said articulation means comprising a pivot shaft extending through said support and having a conical point, said carriage including a plate having an enlarged conical seat disposed beneath said support close to said record, a guide member connected to said carriage and including a guiding surface, said pivot shaft sliding at its upper end along said guiding surface whereby said pivot shaft may move angularly in a plane perpendicular to the surface of and tangential to the grooves of said record and also to rotate around its axis which is substantially perpendicular to the plane of the record, said guide member located further away from the surface of the record than said conical point of said pivot shaft.

4. In a pick-up device for a phonograph record turntable comprising a tangentially moving tone arm including a mounting block, at least one rectilinear guide member extending parallel to the radius of a record on said turntable, a servo-motor in said mounting block, a carriage movable along said guide member, a support beneath said carriage, a pick-up head at one end of said support, articulation means connecting the other end of said support to said carriage, a device on said carriage supplying an electric signal indicating the position of said support relative to said carriage and said servo-motor controlling the displacement of the carriage in response to said signal, the improvement wherein said rectilinear guide member extends over the record upper face, the length of said support is shorter than the radius of said record, said articulation means comprises a pivot member having a conical point, said carriage including a plate having an enlarged conical seat disposed beneath said support close to said record, said pivot member point engaged in said enlarged conical seat, a stud fixed to said carriage and depending therefrom, a guide member connected to said support and including a guiding surface, said stud sliding along the guiding surface of said guide member, whereby said guide member may move angularly in a plane perpendicular to the surface of and tangential to the grooves of said record, and also to rotate around a substantially vertical axis of the carriage, said guide member located further away from the surface of the record than said conical point of said pivot member.

* * * * *